(12) United States Patent
Duan et al.

(10) Patent No.: US 10,885,352 B2
(45) Date of Patent: Jan. 5, 2021

(54) METHOD, APPARATUS, AND DEVICE FOR DETERMINING LANE LINE ON ROAD

(71) Applicant: Baidu Online Network Technology (Beijing) Co., Ltd., Beijing (CN)

(72) Inventors: Xiong Duan, Beijing (CN); Wang Zhou, Beijing (CN); Miao Yan, Beijing (CN); Yifei Zhan, Beijing (CN); Changjie Ma, Beijing (CN); Xianpeng Lang, Beijing (CN); Yonggang Jin, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 90 days.

(21) Appl. No.: 16/231,015

(22) Filed: Dec. 21, 2018

(65) Prior Publication Data
US 2019/0205665 A1    Jul. 4, 2019

(30) Foreign Application Priority Data
Dec. 29, 2017    (CN) .......................... 2017 1 1475639

(51) Int. Cl.
G06K 9/00    (2006.01)
G06T 7/50    (2017.01)

(52) U.S. Cl.
CPC .......... G06K 9/00798 (2013.01); G06T 7/50 (2017.01); G06T 2207/10028 (2013.01); G06T 2207/30256 (2013.01)

(58) Field of Classification Search
CPC .................. G06K 9/00798; G06T 7/50; G06T 2207/30256; G06T 2207/10028; G01S 17/88; G01C 21/26
See application file for complete search history.

(56) References Cited

U.S. PATENT DOCUMENTS 5,815,825 A * 9/1998 Tachibana .............. G05D 1/024
                                                        180/169
5,904,725 A * 5/1999 Iisaka ....................... G01S 5/16
                                                        701/523
(Continued)

FOREIGN PATENT DOCUMENTS

CN            105261020 A        1/2016
CN            105528558 A        4/2016
(Continued)

OTHER PUBLICATIONS

Niu, J. et al.; "Robust Lane Detection using Two-stage Feature Extraction"; Pattern Recognition, vol. 59, pp. 225-233; 2016 (9 pages).

*Primary Examiner* — Aaron W Carter
(74) *Attorney, Agent, or Firm* — Nixon Peabody LLP

(57) ABSTRACT

The disclosure relates to a method, apparatus, device, and computer readable storage medium for determining a lane line on a road. The method includes: acquiring a first curve as a reference curve, the first curve being obtained by fitting a first set of points selected from sets of points in different areas of the road; iteratively executing operations: selecting a second set of points from the sets of points based on the reference curve; generating a second curve by fitting the second set of points, determining a difference between a fitting degree associated with the reference curve and a fitting degree associated with the second curve, determining whether a convergence condition is met based on the difference, and setting the second curve as the reference curve if not met and determining the lane line of the road based on the second set of points if met.

17 Claims, 6 Drawing Sheets

(56) References Cited

U.S. PATENT DOCUMENTS

| | | | |
|---|---|---|---|
| 8,311,283 B2 | 11/2012 | Wu | |
| 9,057,203 B2 | 6/2015 | Butterfield | |
| 10,650,271 B2* | 5/2020 | Nakata | G06K 9/00979 |
| 2006/0184297 A1* | 8/2006 | Higgins-Luthman | B60W 40/04 |
| | | | 701/41 |
| 2010/0002911 A1* | 1/2010 | Wu | B60W 30/12 |
| | | | 382/104 |
| 2010/0054538 A1* | 3/2010 | Boon | G06K 9/00798 |
| | | | 382/104 |
| 2011/0261168 A1* | 10/2011 | Shima | G06K 9/00805 |
| | | | 348/47 |
| 2012/0050489 A1* | 3/2012 | Gupta | G06K 9/00798 |
| | | | 348/46 |
| 2015/0019122 A1* | 1/2015 | Wang | G01C 21/20 |
| | | | 701/409 |
| 2015/0168547 A1* | 6/2015 | Lee | G01S 13/931 |
| | | | 342/104 |
| 2016/0018229 A1* | 1/2016 | Lee | B60W 30/14 |
| | | | 701/409 |
| 2016/0247029 A1* | 8/2016 | Dorum | G06T 11/203 |
| 2017/0177951 A1* | 6/2017 | Yang | G06T 7/155 |
| 2017/0262734 A1* | 9/2017 | Nakata | G06K 9/00979 |
| 2017/0316684 A1* | 11/2017 | Jammoussi | G08G 1/0112 |
| 2018/0046867 A1* | 2/2018 | Yang | G06K 9/6215 |
| 2018/0060677 A1* | 3/2018 | Bai | G06K 9/627 |
| 2018/0181817 A1* | 6/2018 | Yan | G06K 9/6273 |
| 2018/0276483 A1* | 9/2018 | Zeng | G06T 7/13 |
| 2019/0193785 A1* | 6/2019 | Ku | B60R 16/0231 |
| 2019/0205640 A1* | 7/2019 | Zhan | G06K 9/00798 |
| 2019/0205663 A1* | 7/2019 | Ji | G05D 1/0246 |
| 2019/0205664 A1* | 7/2019 | Duan | G06T 5/002 |
| 2019/0205665 A1* | 7/2019 | Duan | G06K 9/00798 |
| 2019/0266418 A1* | 8/2019 | Xu | G06K 9/00798 |
| 2019/0279004 A1* | 9/2019 | Kwon | G06T 7/70 |
| 2020/0089191 A1* | 3/2020 | Chang | G05B 19/4065 |
| 2020/0104607 A1* | 4/2020 | Kim | G06K 9/00798 |
| 2020/0180619 A1* | 6/2020 | Lee | G08G 1/167 |
| 2020/0201344 A1* | 6/2020 | Viswanathan | G05D 1/0088 |
| 2020/0234063 A1* | 7/2020 | Min | B60W 30/12 |

FOREIGN PATENT DOCUMENTS

| | | |
|---|---|---|
| CN | 106407893 A | 2/2017 |
| CN | 107045629 A | 8/2017 |
| CN | 107097794 A | 8/2017 |
| CN | 104766058 B | 4/2018 |
| CN | 105701449 B | 4/2019 |
| JP | 2011258131 A | 12/2011 |
| JP | 2017010554 A | 1/2017 |
| JP | 2017223511 A | 12/2017 |
| KR | 101504252 B1 | 3/2015 |
| KR | 20170083462 A | 7/2017 |

* cited by examiner

METHOD, APPARATUS, AND DEVICE FOR DETERMINING LANE LINE ON ROAD

CROSS-REFERENCE TO RELATED APPLICATIONS

This application claims priority to Chinese Patent Application No. 201711475639.5, filed on Dec. 29, 2017, titled "Method Apparatus, and Device for Determining Lane Line on Road," which is hereby incorporated by reference in its entirety.

TECHNICAL FIELD

Embodiments of the present disclosure relate to the field of data processing, and more specifically to a method, apparatus, device, and computer readable storage medium for determining a lane line on a road.

BACKGROUND

With the development of artificial intelligence, the autonomous driving technology has attracted great attention. The three-dimensional high-precision map is universally recognized by the industrial circle as the main development direction of the next generation digital map, is the prerequisite for realizing autonomous driving of vehicles, and provides the main basis for accurately positioning and making proper decisions on autonomously driven vehicles.

The high-precision maps are important strategic platform resources for analyzing road utilization states and realizing intelligent transport. The core problems of generating the three-dimensional high-precision map focus on the detection and generation of the lane line information on the road surfaces. The conventional lane line detection technology is difficult to exclude other lines, such as zebra crossings, and traffic lines, having similar characteristics as the lane lines, and therefore may affect the decision making of the autonomous driving.

SUMMARY

Embodiments according to the present disclosure provide a solution for determining a lane line on a road.

A first aspect of the present disclosure provides a method for determining a lane line on a road. The method includes: acquiring a first curve for use as a reference curve, the first curve being obtained by fitting a first set of points, and the first set of points being selected from a plurality of sets of points in different areas of the road; iteratively executing operations for at least one time: selecting a second set of points from the plurality of sets of points based on the reference curve; generating a second curve by fitting the second set of points, determining a fitting degree difference between a first fitting degree associated with the reference curve and a second fitting degree associated with the second curve, determining whether a convergence condition is met at least partially based on the fitting degree difference, and setting the second curve as the reference curve, in response to failing to meet the convergence condition; and determining the lane line of the road based on the second set of points when the convergence condition is met.

A second aspect of the present disclosure provides an apparatus for determining a lane line on a road. The apparatus includes: a curve acquisition module configured for acquiring a first curve for use as a reference curve, the first curve being obtained by fitting a first set of points, and the first set of points being selected from a plurality of sets of points in different areas of the road; a curve updating module configured for iteratively executing following operations for at least one time: selecting a second set of points from the plurality of sets of points based on the reference curve; generating a second curve by fitting the second set of points, determining a fitting degree difference between a first fitting degree associated with the reference curve and a second fitting degree associated with the second curve, determining whether a convergence condition is met at least partially based on the fitting degree difference, and setting the second curve as the reference curve, in response to failing to meet the convergence condition; and a lane line determining module configured for determining the lane line of the road based on the second set of points when the convergence condition is met.

A third aspect of the present disclosure provides a device, including one or more processors; and a memory for storing one or more programs. The one or more programs, when executed by the one or more processors, cause the one or more processors to implement the method according to the first aspect of the present disclosure.

A fourth aspect of the present disclosure provides a computer readable storage medium storing a computer program therein. The program, when executed by a processor, cause the processor to implement the method according to the first aspect of the present disclosure.

It should be understood that the content described in the Summary section is neither intended to limit key or important features of the embodiment of the present disclosure, nor used for limiting the scope of the present disclosure. Other feature of the present disclosure may become readily understood based on following description.

BRIEF DESCRIPTION OF THE DRAWINGS

Other features, objectives and advantages of the present disclosure will become more apparent upon reading the detailed description to non-limiting embodiments with reference to the accompanying drawings. Identical or similar reference numerals in the drawings represent identical or similar elements.

DETAILED DESCRIPTION OF EMBODIMENTS

Figure 1:
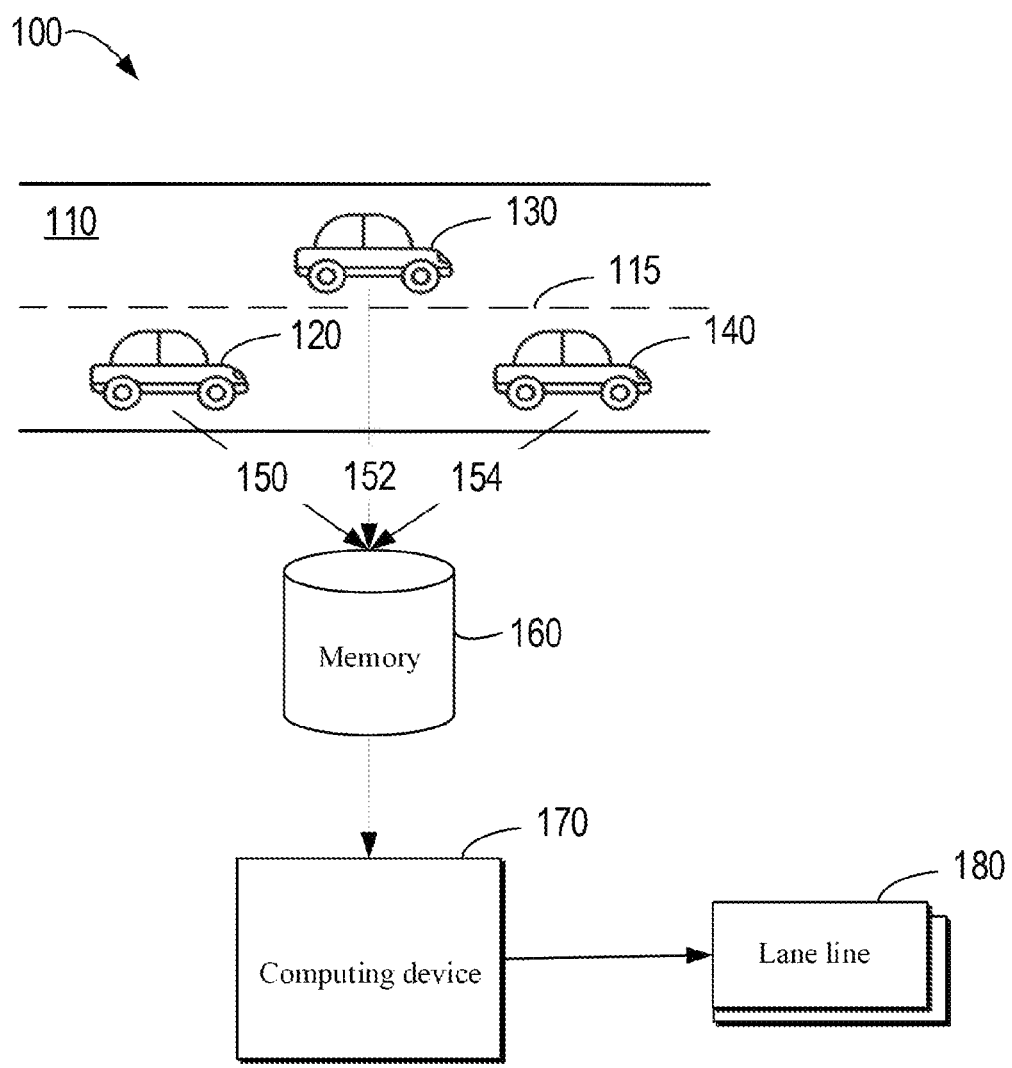
FIG. 1 shows a schematic diagram of an exemplary environment in which a plurality of embodiments of the present disclosure may be implemented.

Embodiments of the present disclosure will be described in more detail hereinafter by referring to the accompanying drawings. Though embodiments of the disclosure are shown in the drawings, it should be understood that the disclosure may be implemented in various forms, and should not be construed as limited to the embodiments set forth herein. Rather, these embodiments are provided to more thoroughly and completely understand the disclosure. It should be understood that the drawings and embodiments of the disclosure are only used as examples, rather than limiting the scope of the disclosure.

In the embodiments of the present disclosure, the term "include" and other similar terms should be understood as open-ended inclusion, i.e., "including but not limited to." The term "based on" should be understood as "at least partially based on." The term "an embodiment" or "the embodiment" should be understood as "at least one embodiment." The terms, such as "first," and "second," may refer to different or identical objects. Other explicit and implicit definitions may also be included hereinafter.

In order to facilitate understanding by those skilled in the art, some specific numeral values are used in the embodiments of the present disclosure, but it should be understood that these numeral values are only illustrative, and are not intended to limit the scope of the present disclosure.

As mentioned above, in the conventional solution, the determination of a lane line on a road is implemented by collecting three-dimensional point cloud through a lidar, or based on image data collected by an image sensor. Such a solution has defects in terms of accuracy, adaptability, or the like. For example, for a complex scenario having a zebra crossing and a traffic line, the zebra crossing or the traffic line has visual characteristics and laser reflection characteristics similar to those of the lane line, so the conventional solution is difficult to effectively distinguish the zebra crossing or the traffic line from the lane line. Therefore, the zebra crossing or the traffic line may mistakenly be recognized as the lane line, thus affecting the decision making of the autonomous driving.

An embodiment according to the present disclosure provides a solution for determining a lane line on a road. In the solution, fitting is iterated using a fitting degree of a curve obtained by fitting, until the fitted curve converges sufficiently. In the process of determining convergence, three-dimensional point cloud data and/or image data of the lane line on the road acquired by the lidar and/or the image sensor may also be combined, such that candidate points selected each time for fitting the curve are points having high probabilities being located on the lane line, and being determined based on the three-dimensional point cloud data and/or the image data.

Such a solution may enable the generated lane line to have better curve characteristics. Furthermore, by determining the convergence of the fitted curve, the solution can further effectively distinguish interferences of the zebra crossing, the traffic line, or the like having characteristics similar to characteristics of the lane line, thereby improving the accuracy of the generated lane line.

Embodiments of the present disclosure will be described in detail by referring to the accompanying drawings. FIG. 1 shows a schematic diagram of an exemplary environment 100 in which a plurality of embodiments of the present disclosure may be implemented. In the exemplary environment 100, a computing device 170 determines an recognized lane line 180 based on sensor data 150, 152, and 154.

To recognize a lane line 115 on a road 110, one or more collection subjects may move on the road 110, such as a collection subject 120, a collection subject 130, and a collection subject 140. Taking the collection subject 120 as an example, the collection subject 120 may be provided with one or more sensor devices, including, e.g., a lidar device and an image collection device. The lidar device may collect three-dimensional point cloud data of the road 110, and the image collection device may collect an image of the lane line 115 on the road 110. In some embodiments, the collection subject 120 may also be provided with a positioning device, to determine a location of the collection subject when collecting the image.

In some embodiments, the collection subject 120, 130, or 140 may be further provided with a communication apparatus, to transfer the collected sensor data 150, 152, and 154 to a memory 160 in a wired or wireless way. According to the embodiment of the present disclosure, the computing device 170 acquires the sensor data from the memory 160, and determines the recognized lane line 180 based on the sensor data.

Figure 2:
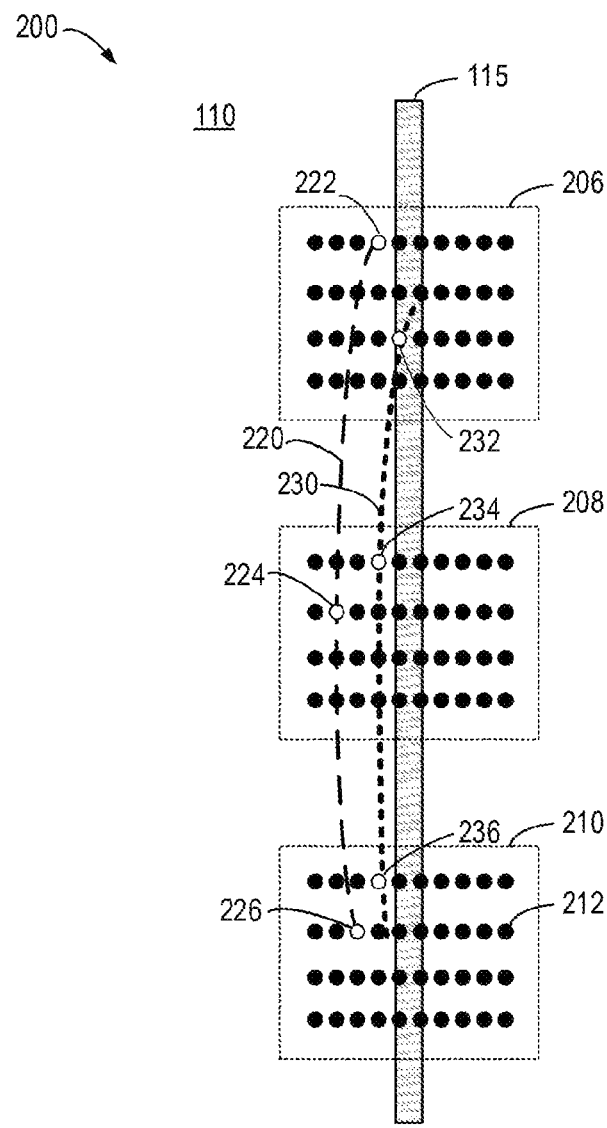
FIG. 2 shows a schematic diagram of generating a lane line according to some embodiments of the present disclosure.
Figure 3:
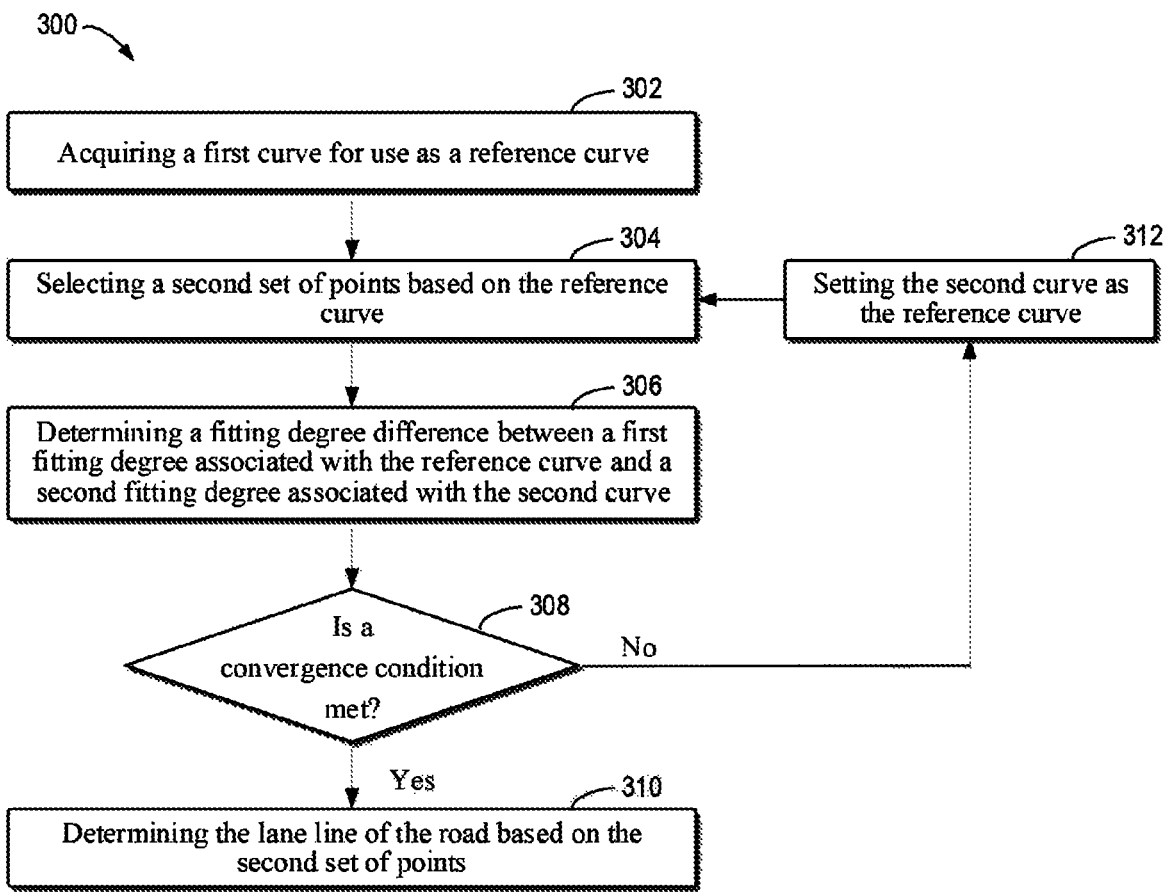
FIG. 3 shows a flow chart of a method for determining a lane line on a road according to some embodiments of the present disclosure.

A method for determining a lane line on a road according to an embodiment of the present disclosure will be described hereinafter by referring to FIG. 2 to FIG. 3. FIG. 2 shows a schematic diagram 200 for determining a lane line according to an embodiment of the present disclosure, and FIG. 3 shows a flow chart of a method 300 for determining a lane line on a road according to an embodiment of the present disclosure.

As shown in FIG. 2, the lane line 115 on the road 110 may be determined by moving one or more collection subjects 120 as shown in FIG. 1 on the road 110, to obtain sensor data of the lane line on the road, i.e., three-dimensional point cloud data and/or image data.

In some embodiments, for the collected sensor data, the sensor data of a predetermined area may be selected at intervals of a predetermined distance (for example, two meters) along a traveling path of a collection vehicle, to determine the lane line, thereby reducing calculation needed on a prerequisite of ensuring enough accuracy. In some embodiments, for example, an area within a radius of 0.5 m around the collection subject 120 may be used as the predetermined area. As shown in FIG. 2, examples of the predetermined area (a first area 206, a second area 208, and a third area 210) are given. It should be understood that such predetermined areas are merely exemplary, and the predetermined areas may alternatively be selected based on any other appropriate way, thereby reducing determination of areas where the lane line is not likely to be located.

One or more locations in each of the predetermined areas 206, 208, and 210 may be pre-selected or set, and two-dimensional or three-dimensional coordinates of the locations may correspond to a plurality of points 212. An example in FIG. 2 schematically shows the points 212 corresponding to the locations in the predetermined areas 206, 208, and 210. In some embodiments, the points 212 may correspond to sampling points in three-dimensional point cloud data acquired by a lidar. The locations and the points in the areas may be used interchangeably hereinafter to facilitate discussion. A flow 300 for determining a lane line will be described hereinafter by referring to FIG. 3.

In block 302: acquiring a first curve for use as a reference curve. The first curve is obtained by fitting a first set of points. The first set of points may be selected from a plurality of sets of points in different areas of the road. As shown in FIG. 2, the first curve 220 is obtained by fitting a point 222 in the first area 206, a point 224 in the second area 208, and a point 226 in the third area 210.

In some embodiments, the point for fitting the first curve in each predetermined area may be determined based on the three-dimensional point cloud data. Because a surface material of the lane line has a high laser reflectivity, whether a point possibly belongs to the lane line may be determined based on laser reflectivities at locations denoted by the points in the obtained three-dimensional point cloud data. For example, for the first area 206, one or more points having highest laser reflectivities may be selected based on point cloud reflectivities of all points in the area for use as the points for fitting the first curve. In some embodiments, one or more points for fitting the first curve may alternatively be determined based on a specific laser reflectivity threshold. In the example shown in FIG. 2, for example, the points 222 for fitting the first curve selected in the first area 206 may be points having the highest laser reflectivities in the first area 206.

In some embodiments, the points for fitting the first curve in each predetermined area may be determined based on image data. In some embodiments, the image data may include depth data of pixel points. In this case, a conventional image processing algorithm may be used for processing the image data, to determine a confidence level that each pixel point in the image data is located on a lane line. In some embodiments, for example, the image data may be analyzed using a deep learning algorithm to obtain a classification result of pixel points, thus obtaining the confidence level that each pixel point in the image data is located on the lane line. In some embodiments, for example, the confidence level that each pixel point in the image data is located on the lane line may alternatively be determined simply based on a gray value of a pixel. For example, based on a sampled gray value range of the lane line, a pixel point having a detected gray value within the range may be considered as a pixel point having a high confidence level. It should be understood that any other appropriate image processing method may be used to determine the confidence level that each pixel point in the image is located on the lane line. The confidence level may denote a likelihood or probability that each pixel point is located on the lane line.

After determining the confidence levels of the pixel points in the collected image, mapping from image data to points in a predetermined area may be established based on locations (e.g., provided by a GPS) of the collection subjects 120 when collecting the image, calibration parameters of an image sensor, and depth data of the image, to obtain a confidence level that the location denoted by the point in the predetermined area belongs to the lane line. It can be understood that in the process of establishing the mapping from pixel points in the image data to the points in the predetermined area, some points may not have corresponding image pixel points. In this case, the confidence levels of these points may be set as fixed values (for example, 0 or any other appropriate value).

In some embodiments, the image data may not include depth information. In this case, the pixel points in the image data reflect two-dimensional locations, while the points in the predetermined area reflect three-dimensional locations. Therefore, in the process of establishing mapping from the pixel points to the points in the predetermined area, a point in the two-dimensional locations may be mapped to a line in the three-dimensional locations. In some embodiments, a point closest to the collection subject 120 on the mapped line may be selected for use as a mapped location of a pixel point in the image data, and the confidence level of the point may be set as the confidence level of the pixel point, and the confidence levels of other points on the line may be set as fixed values (e.g., 0).

Furthermore, similar to the laser reflectivity discussed hereinabove, based on the confidence levels of points determined by the mapping between the pixel points in the image data and the points in the predetermined area, one or more points having highest confidence levels in the predetermined area may be selected for fitting the first curve, or one or more points having confidence levels higher than a predetermined threshold in the predetermined area may be selected for fitting the first curve. In the example shown in FIG. 2, for example, the points 222 for fitting the first curve selected in the first area 206 may be points having the highest confidence levels in the first area 206.

In some embodiments, the points for fitting the first curve may alternatively be determined based on both the laser reflectivity and the image data confidence level, to improve the accuracy of the selected points. In some embodiments, the laser reflectivity and the confidence level may be normalized respectively, and assigned with respective weights, and a score of each point is determined based on a weighted sum of the laser reflectivity and the confidence level. The score can reflect a possibility that a location corresponding to each point determined based on sensor data belongs to a lane line. For example, the score Point Score of the point may be determined based on following equation:

Point Score=$\alpha$*Point_Cloud_Rate+$\beta$*Image_Conf, where $\alpha$ and $\beta$ denote weighting coefficients, Point_Cloud_Rate denotes a point cloud reflectivity of the point, and Image_Conf denotes a confidence level of the point. In some embodiments, the laser reflectivity may relatively more accurately reflect the possibility that a location is on a lane line. Therefore, a high weight value $\alpha$ may be assigned to the laser reflectivity, and a low weight value $\beta$ may be assigned to the confidence level. In some embodiments, one or more points having highest scores in the predetermined area may be selected for fitting the first curve, or one or more points having scores higher than a predetermined threshold in the predetermined area may be selected for fitting the first curve. In the example shown in FIG. 2, for example, the points 222 for fitting the first curve selected in the first area 206 may be points having the highest scores in the first area 206. By integrating three-dimensional point cloud data and image data, the two kinds of data can corroborate each other. Only if both the two kinds of data reflect that the location denoted by the point may on the lane line, the point may obtain a high score. Thus, such a solution may be more accurate, compared with the conventional solutions.

After determining points for fitting the first curve in each predetermined area, a curve fitting algorithm may be used for performing curve fitting on the determined points. In some embodiments, a plurality of determined points may be fitted using an RANSAC algorithm. It should be understood that any other appropriate curve fitting algorithm may also be used for curve fitting on the plurality of determined points, to determine the first curve. For example, in the example shown in FIG. 2, a curve obtained by fitting the selected points 222, 224, and 226 is a first curve 214.

Further reference is made to FIG. 3. In block 304: selecting a second set of points from the plurality of sets of points in different areas based on the reference curve. In some embodiments, for a current reference curve (i.e., the first curve 214), Euclidean distances from points in predetermined areas to the first curve 214 may be calculated, and a second set of points may be selected based on the distances. For example, one or more points closest to the first curve 214 in the predetermined area may be selected, or one or more points having the distances smaller than a predetermined threshold in the predetermined area may be selected. In some embodiments, new scores of points in the predetermined area may also be determined based on the distances. For example, the score Point_Score_New of each point may be determined according to following formula:

$$\text{point\_score\_new} = 2/(1+e^{\wedge}(f*\text{Dist})),$$

where f may be a constant, and Dist denotes the Euclidean distance from a point to the reference curve. In this case, for example, one or more points having highest scores in the predetermined area may be selected, or one or more points having scores higher than a predetermined threshold in the predetermined area may be selected for use as the second set of points, such that points closer to the reference curve are selected preferentially, thereby enabling the new curve to be smoother.

Figure 4:
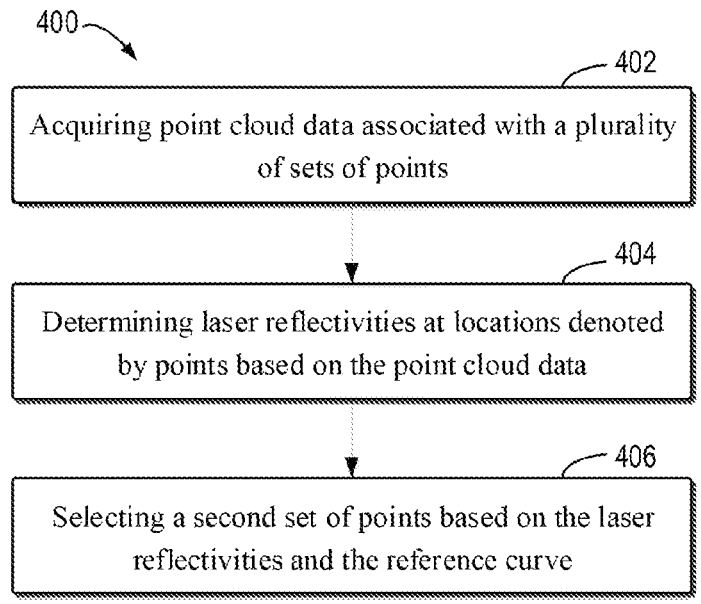
FIG. 4 shows a flow chart of a method for selecting a second set of coordinate points according to an embodiment of the present disclosure.
Figure 5:
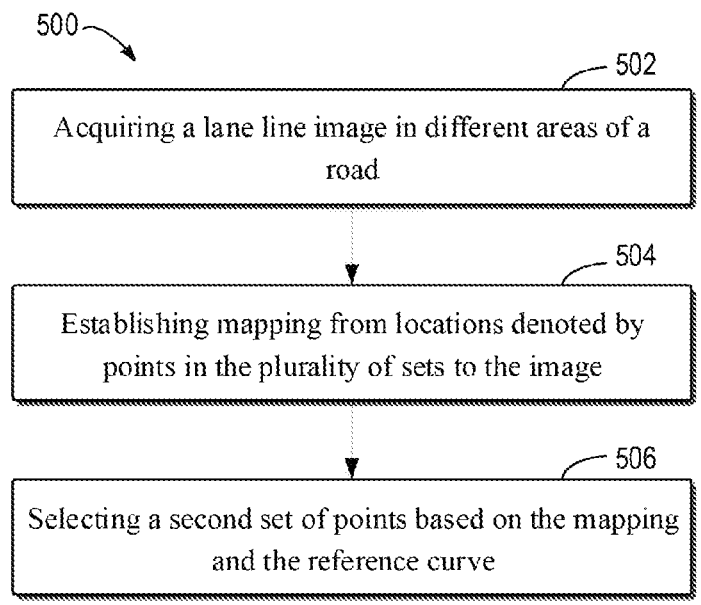
FIG. 5 shows a flow chart of a method for selecting a second set of coordinate points according to another embodiment of the present disclosure.

In some embodiments, the second set of points may alternatively be determined based on the three-dimensional point cloud data. As shown in FIG. 4, the method 400 is an exemplary embodiment of the block 304.

In block 402: acquiring point cloud data associated with a plurality of sets of points in different areas of a road. In some embodiments, three-dimensional point cloud data in different areas of the road may be acquired by a lidar, and point cloud data associated with a plurality of sets of points may be determined based on matching between locations corresponding to the plurality of sets of points and locations of lidar sampling points. In block 404: determining laser reflectivities at locations denoted by points in the plurality of sets based on the point cloud data.

In block 406: selecting the second set of points based on the laser reflectivities and the reference curve. In some embodiments, scores of points in the predetermined area may be re-determined based on the laser reflectivities and the reference curve. In some embodiments, as mentioned above, Euclidean distances from points in the predetermined area to the reference curve may be determined. In this case, the score Ponit_Score_New may be determined based on, for example, following equation:

$$\text{Ponit\_Score\_New} = \alpha 1 * \text{Point\_Cloud\_Rate} + \beta 1 * \text{Point\_Dist\_Score},$$

$$\text{Point\_Dist\_Score} = 2/(1+e^{\wedge}(f*\text{Dist}))$$

where $\alpha 1$ and $\beta 1$ denote weighting coefficients, Point_Cloud_Rate denotes a laser reflectivity at a location denoted by a point, Dist denotes a Euclidean distance from the point to the reference curve, and f is a constant. In this case, for example, one or more points having highest scores in the predetermined area may be selected, or one or more points having scores higher than a predetermined threshold in the predetermined area may be selected, such that a point closer to the reference curve and having a high laser reflectivity is selected preferentially. Based on this approach, on the one hand, as mentioned above, the obtained curve may be smoother; and on the other hand, both the laser reflectivity and the distance to the curve are considered in the process selecting the second set of points, thus the lane line result determined only based on the laser reflectivity may be further corrected, thereby avoiding resulting in error detections, and improving the accuracy of the lane line.

In some embodiments, the second set of points may alternatively be determined based on the image data. As shown in FIG. 4, the method 400 is another exemplary embodiment of the block 304. In block 502: acquiring lane line images in different areas of the road. In some embodiments, for example, lane line images in different areas of the road may be acquired by a photographic apparatus.

In block 504, establishing mapping from locations denoted by points in the plurality of sets to the image. In some embodiments, the lane line image may further include depth information. In this case, a conventional image processing algorithm may be used for processing the image data, to determine a confidence level that each pixel point in the image data is the lane line. As mentioned above, for example, the image data may be analyzed using a deep learning algorithm to obtain a classification result of pixel points, thus obtaining the confidence level that each pixel point belongs to the lane line. In some embodiments, for example, the confidence level that the pixel point belongs to the lane line may alternatively be determined simply based on the gray value of the pixel. For example, based on a general range of gray values of the lane line, pixel points that have gray values within the range have high confidence levels. It should be understood that any other appropriate image processing method may be used to determine the probability that each pixel point in the image belongs to the lane line.

After determining the confidence level of each pixel point in a collected image, mapping from image data to points in the predetermined area may be established based on locations (e.g., provided by a GPS) of the collection subjects 102 when collecting the image, calibration parameters of an image sensor, and depth data of the image, to obtain the confidence level that the location corresponding to the point in the predetermined area belongs to the lane line. It may be understood that in the process of establishing the mapping from pixel points in the image data to the points in the predetermined area, some points may not have corresponding image data. In this case, the confidence levels of these points may be set as fixed values (for example, 0 or any other appropriate value).

In some embodiments, the image data may not include depth information. In this case, the pixel points in the image data reflect two-dimensional locations, and the points in the predetermined area reflect three-dimensional locations. Therefore, in the process of establishing mapping from the pixel points to the points in the predetermined area, a point in the two-dimensional locations may be mapped to a line in the three-dimensional locations. In some embodiments, a point closest to the collection subject 102 on the line may be selected for use as a mapped location of a pixel point in the image data, and the confidence level of the point may be set as the confidence level of the pixel point, and the confidence levels of other points on the line may be set as fixed values (e.g., 0 or any other appropriate value).

In block 506: selecting the second set of points based on the mapping and the reference curve. In some embodiments, the score of the point may be re-determined based on the confidence level of the point obtained by the mapping and the distance to the reference curve. For example, in some embodiments, as mentioned above, a Euclidean distance from each point in the predetermined area to the reference curve may be determined. In this case, the score Ponit_Score_New of the point may be determined based on, for example, following equation:

$$\text{Ponit\_Score\_New} = \alpha 2 * \text{Image\_Conf} + \beta 2 * \text{Point\_Dist\_Score},$$

$$\text{Point\_Dist\_Score} = 2/(1+e^{\wedge}(f*\text{Dist})),$$

where α2 and β2 denote weighting coefficients, Image_Conf denotes a confidence level of a point, Dist denotes a Euclidean distance from the point to the reference curve, and f is a constant. In this case, for example, one or more points having highest scores in the predetermined area may be selected, or one or more points having scores higher than a predetermined threshold in the predetermined area may be selected, such that a point closer to the reference curve and having a high confidence level is selected preferentially. Based on this approach, on the one hand, as mentioned above, the obtained curve may be smoother; and on the other hand, both the confidence level that the point is located on the lane line determined based on the image and the distance to the curve are considered in the process selecting the second set of points, thus, the lane line result determined only based on the image data may be further corrected, thereby avoiding resulting in error detections, and improving the accuracy of the lane line.

In some embodiments, the second set of points may alternatively be determined based on the three-dimensional point cloud data and the image data. As mentioned hereinabove, the three-dimensional point cloud data and the corresponding lane line images in different areas of the road may be acquired. Based on a process similar to that hereinabove, the laser reflectivity, the confidence level, and the distance to the reference curve of each point in each predetermined area, may be determined. In this case, the score of the point may be calculated based on following formula:

Ponit_Score_New=α3*Point_Cloud_Rate+ β3*Image_Conf+γ*Point_Dist_Score,

Point_Dist_Score=2/(1+e^(f*Dist)), where α3, β3, and γ denote weighting coefficients, Point_Cloud_Rate denotes a laser reflectivity at a location denoted by a point, Image_Conf denotes the confidence level of the point, Dist denotes a Euclidean distance from the point to a reference curve, and f is a constant. In this case, for example, one or more points having highest scores in the predetermined area may be selected, or one or more points having scores higher than a predetermined threshold in the predetermined area may be selected, such that a point closer to the reference curve, having a high laser reflectivity, and having a high confidence level is selected preferentially, thus the second set of points may be closer to the practical lane line.

With this approach, on the one hand, as mentioned above, the obtained curve may be smoother; and on the other hand, the laser reflectivity, the confidence level that the point is located on the lane line determined based on an image, and the distance to the curve are all considered in the process of selecting the second set of points. Therefore, first, the detection result may be obtained based on comprehensive validation of a plurality of parameters, and may be more accurate. Furthermore, the lane line result determined by sensor fusion can be further corrected because of further considering the distance from the point to the reference curve, thereby avoiding resulting in error detections, and improving the accuracy of the lane line.

For example, in the example shown in FIG. 2, the point selected in the first area 206 is point 232, the point selected in the first area 206 is point 234, the point selected in the first area 206 is point 236, and the curve obtained by fitting the points is second curve 230.

Figure 6:
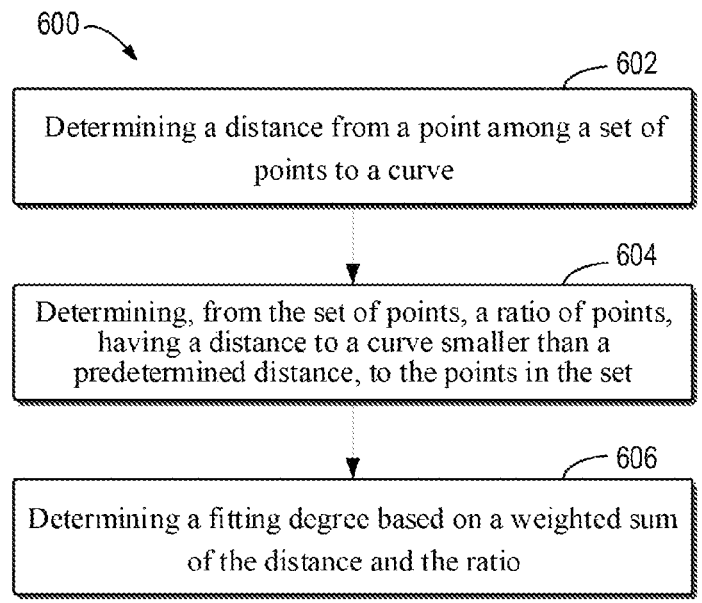
FIG. 6 shows a flow chart of an exemplary method for calculating a fitting degree according to some embodiments of the disclosure.

Further reference is made to FIG. 3. In block 306: determining a fitting degree difference between a first fitting degree associated with the reference curve and a second fitting degree associated with the second curve. In some embodiments, the fitting degree reflects a fitting degree between points for fitting a curve and the curve obtained by the fitting. Referring to FIG. 6, FIG. 6 shows a flow chart of a method 600 for determining a fitting degree according to an embodiment of the present disclosure.

In block 602: determining a distance from a point among a set of points to a curve. For example, taking the second curve as an example, in some embodiments, the distance is a Euclidean distance from a point in the second set to the second curve. In block 604: determining, from a set of points, a ratio of points, having distances to the curve smaller than a predetermined distance, to points in the set. Taking the second curve as an example, in some embodiments, for example, the ratio may be determined according to following calculation formula:

Ratio=Count(Dist<Dist_Threshold)/Amount, where Dist denotes a distance from a point for fitting the second curve to the second curve, Dist_Threshold denotes a distance threshold, Amount denotes a number of points for fitting the curve, and Count (Dist<Dist_Threshold) denotes a number of points having distances to the second curve smaller than the threshold distance. In some embodiments, the threshold distance may be selected as a half of a width value of the lane line, such that all points within the width of the lane line have a good fitting degree.

In block 606: determining a fitting degree based on a weighted sum of the distance and the ratio. Taking the second curve as an example, in some embodiments, for example, an average distance score Average Dist Score of all points for fitting the curve may be determined first based on the distances:

Average_Dist_Score=Sum(Point_Dist_Score)/ Amount,

Point_Dist_Score=2/(1+e^(f*Dist)), where Dist denotes a distance from a point for fitting the second curve to the second curve, f is a constant, Amount denotes a number of points for fitting the curve, and Sum (Point_Dist_Score) denotes a sum of distance scores of points for fitting the curve. In some embodiments, a second fitting degree Fit_Score_2 may then be calculated based on the average distance score and the ratio:

Fit_Score_2=α4*Average_Dist_Score+β4*Ratio, where α4 and β4 denote weighting coefficients. The fitting degree is calculated based on the above approach by considering both the matching degree between the curve and points, and features of the lane line having a specific width, thereby more accurately reflecting a possibility that the point for fitting the curve is a point on a candidate lane line.

Further reference is made to FIG. 3. It should be understood that the first fitting degree associated with the reference curve may also be determined according to the flow 600. In some embodiments, the fitting degree difference may be expressed as a value of difference between the second fitting degree and the first fitting degree.

In block 308: determining whether a convergence condition is met. In some embodiments, the convergence condition may be associated with the fitting degree difference. In some embodiments, for example, whether an absolute value of the fitting degree difference is smaller than a predetermined threshold may be determined, and if the absolute value of the fitting degree difference is smaller than the predetermined threshold, then the two curves are very close, i.e., sufficiently converge. In some embodiments, for example, when the value of the fitting degree difference is greater than or equal to 0 and smaller than the predetermined threshold, i.e., the quality of the second curve is better than the quality of the reference curve, and the two curves are very close. In this case, it may be difficult to significantly improve the quality of the curve by further iteration. Therefore, the convergence condition being met can be determined.

In some embodiments, the convergence condition may also be associated with the laser reflectivity of the point on the curve. In some embodiments, for example, a first average laser reflectivity associated with the reference curve and a second average laser reflectivity associated with the second curve may be determined respectively. The average laser reflectivity refers to an average value of laser reflectivities at locations denoted by all points on the curve. Then, the difference between the first average laser reflectivity and the second average laser reflectivity, i.e., the laser reflectivity difference, may be calculated based on the first average laser reflectivity and the second average laser reflectivity. In some embodiments, a difference degree score may be obtained based on a weighted sum of the laser reflectivity difference and the fitting degree difference, i.e., the difference degree score Diff_score may be expressed as:

$$\text{Diff\_Score} = \alpha 5 * \text{Diff\_Point\_Cloud\_Ratio} + \beta 5 * \text{Diff\_Fitting\_Score},$$

where $\alpha 5$ and $\beta 5$ denote weighting coefficients, Diff_Point_Cloud_Ratio denotes a laser reflectivity difference, and Diff_Fitting_Score denotes a fitting degree difference. In some embodiments, the difference degree score is then compared with a predetermined threshold, and the convergence condition being met is determined when the difference degree score is smaller than the predetermined threshold. In some embodiments, similarly, the convergence condition being met may alternatively be determined when the difference degree score is greater than or equal to 0 and smaller than the predetermined threshold.

In some embodiments, the convergence condition may also be associated with the confidence level of a point on the curve. In some embodiments, for example, a first average confidence level associated with the reference curve and a second average confidence level associated with the second curve may be determined respectively. The average confidence level refers to an average value of confidence levels of all points on the curve. Then, the difference between the first average confidence level and the second average confidence level, i.e., the confidence level difference, may be calculated based on the first average confidence level and the second average confidence level. In some embodiments, the difference degree score may be obtained based on a weighted sum of the confidence level difference and the fitting degree difference, i.e., the difference degree score Diff_score may be expressed as:

$$\text{Diff\_Score} = \alpha 6 * \text{Diff\_Image\_Conf} + \beta 6 * \text{Diff\_Fitting\_Score},$$

where $\alpha 6$ and $\beta 6$ denote weighting coefficients, Diff_Image_Conf denotes a confidence level difference, and Diff_Fitting_Score denotes a fitting degree difference. In some embodiments, the difference degree score is then compared with a predetermined threshold, and the convergence condition being met is determined when the difference degree score is smaller than the predetermined threshold. In some embodiments, similarly, the convergence condition being met may alternatively be determined when the difference degree score is greater than or equal to 0 and smaller than the predetermined threshold.

It should be understood that, the convergence condition may be associated with the fitting degree difference, the laser reflectivity difference and the confidence level difference, i.e., the difference degree score may be obtained based on a weighted sum of the laser reflectivity difference, the fitting degree difference, and the confidence level difference, i.e., the difference degree score Diff_score may be expressed as:

$$\text{Diff\_Score} = \alpha 7 * \text{Diff\_Point\_Cloud\_Ratio} + \beta 7 * \text{Diff\_Image\_Conf} + \gamma 2 * \text{Diff\_Fitting\_Score},$$

where $\alpha 7$, $\beta 7$ and $\gamma 2$ denote weighting coefficients, Diff_Point_Cloud_Ratio denotes a laser reflectivity difference, Diff_Image_Conf denotes a confidence level difference, and Diff_Fitting_Score denotes a fitting degree difference. In some embodiments, the difference degree score is then compared with a predetermined threshold, and the convergence condition being met is determined when the difference degree score is smaller than the predetermined threshold. In some embodiments, similarly, the convergence condition being met may alternatively be determined when the difference degree score is greater than or equal to 0 and smaller than the predetermined threshold.

If the convergence condition being met is determined in the block 308, then the method 300 goes to the block 310, i.e., determining the lane line of the road based on the second set of points when the convergence condition is met, i.e., outputting the second set of points for use as a final lane line result.

If it is determined that the convergence condition is not met, then the method 300 goes to block 312, i.e., setting the second curve as the reference curve, and then returning to the block 304, i.e., re-selecting the second set of points based on the new reference curve. It should be understood that the blocks 304, 306, 308, and 312 may be executed iteratively, until the convergence condition is met. In some embodiments, in order to balance the calculation result with the calculation overhead, for example, an upper limit of a number of iterations (e.g., 10 times) may be set, i.e., when the number of iterations reaches the upper limit, the convergence condition being met may be determined, the iteration may be automatically terminated, and then the second set of points is outputted for use as the final lane line result.

In conclusion, the solution for determining a lane line according to an embodiment of the present disclosure makes a determination by integrating three-dimensional point cloud data and image data, and is more accurate compared with the solution of recognition by a single sensor. Furthermore, the solution further calculates a score value of each candidate point based on a laser reflectivity, a confidence level, and a distance to a reference curve, and further introduces curve characteristics on the basis of sensor data, such that the obtained curve is smoother, and complies with characteristics of a real lane line. Still furthermore, by repeated iteration, the obtained point may not only have the high laser reflectivity, and the high confidence level, but also is close to the fitted curve, i.e., other road lines having visual characteristics similar to those of the lane line, such as zebra crossings, and lane marker lines may be excluded.

Figure 7:
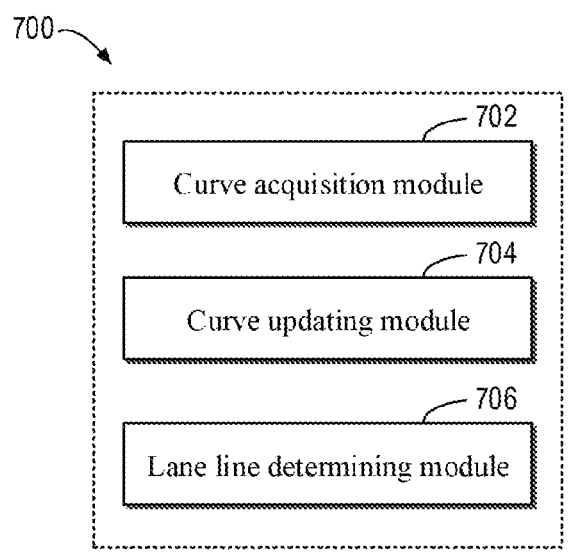
FIG. 7 shows a schematic block diagram of an apparatus for determining a lane line on a road according to an embodiment of the present disclosure.

FIG. 7 shows a schematic block diagram of an apparatus 700 for determining a lane line on a road according to an embodiment of the present disclosure. As shown in FIG. 7, the apparatus 700 includes: a curve acquisition module 702 configured for acquiring a first curve for use as a reference curve, the first curve being obtained by fitting a first set of points, the first set of points selected from a plurality of sets of points in different areas of the road; a curve updating module 704 configured for iteratively executing following operations at least one time: selecting a second set of points from the plurality of sets of points based on the reference curve; generating a second curve by fitting the second set of points, determining a fitting degree difference between a first fitting degree associated with the reference curve and a second fitting degree associated with the second curve, determining whether a convergence condition is met at least partially based on the fitting degree difference, and setting the second curve as the reference curve, in response to failing to meet the convergence condition; and a lane line determining module 706 configured for determining the lane line of the road based on the second set of points when the convergence condition is met.

In some embodiments, the curve updating module 704 further includes: a first point selection module configured for selecting the second set of points based on a distance from the plurality of sets of points to the reference curve, such that a point close to the reference curve is selected preferentially.

In some embodiments, the curve updating module 704 further includes: a point cloud data acquisition module configured for acquiring point cloud data associated with the plurality of sets of points in the different areas of the road; a laser reflectivity determining module configured for determining a laser reflectivity at a location denoted by a point in the plurality of sets based on the point cloud data; and a second point selection module configured for selecting the second set of points based on the point cloud confidence level and the reference curve, such that a point close to the reference curve and having a high laser reflectivity is selected preferentially.

In some embodiments, the curve updating module 704 further includes: a first average laser reflectivity determining module configured for determining a first average laser reflectivity associated with the reference curve based on the laser reflectivities at locations denoted by the points for fitting the reference curve; a second average laser reflectivity determining module configured for determining a second average laser reflectivity associated with the second curve based on the laser reflectivities at locations denoted the by points for fitting the second curve; a laser reflectivity difference determining module configured for determining a laser reflectivity difference between the first average laser reflectivity and the second average laser reflectivity; and a first convergence determining module configured for determining the convergence condition being met, in response to a weighted sum of the laser reflectivity difference and the fitting degree difference being smaller than a predetermined threshold.

In some embodiments, the curve updating module 704 further includes: an image acquisition module configured for acquiring an image of the lane line in the different areas of the road; a mapping module configured for establishing mapping from locations denoted by points in the plurality of sets to the image; and a third point selection module configured for selecting the second set of points based on the mapping and the reference curve, such that a point close to the reference curve and corresponding to a location close to or on the lane line in the image is selected preferentially.

In some embodiments, the curve updating module 704 further includes: a confidence level determining module configured for determining a confidence level that the point belongs to the lane line based on the mapping of the locations denoted by the points; a first average confidence level determining module configured for determining a first average confidence level associated with the reference curve based on the confidence levels of the points for fitting the reference curve; a second average confidence level determining module configured for determining a second average confidence level associated with the second curve based on the confidence levels of the points for fitting the second curve; a confidence level difference determining module configured for determining a confidence level difference between the first average confidence level and the second average confidence level; and a second convergence determining module configured for determining the convergence condition being met, in response to a weighted sum of the confidence level difference and the fitting degree difference being smaller than a predetermined threshold.

In some embodiments, the curve updating module 704 further includes: a third convergence determining module configured for determining the convergence condition being met, in response to the number of iterations reaching a predetermined threshold.

In some embodiments, the curve updating module 704 further includes: a distance determining module configured for determining a distance from the point in the second set to the second curve; a ratio determining module configured for determining, from the second set of points, a ratio of points, having distances to the second curve smaller than a predetermined distance, to the points in the second set; and a fitting degree determining module configured for determining the second fitting degree based on a weighted sum of the average distance and the ratio.

Figure 8:
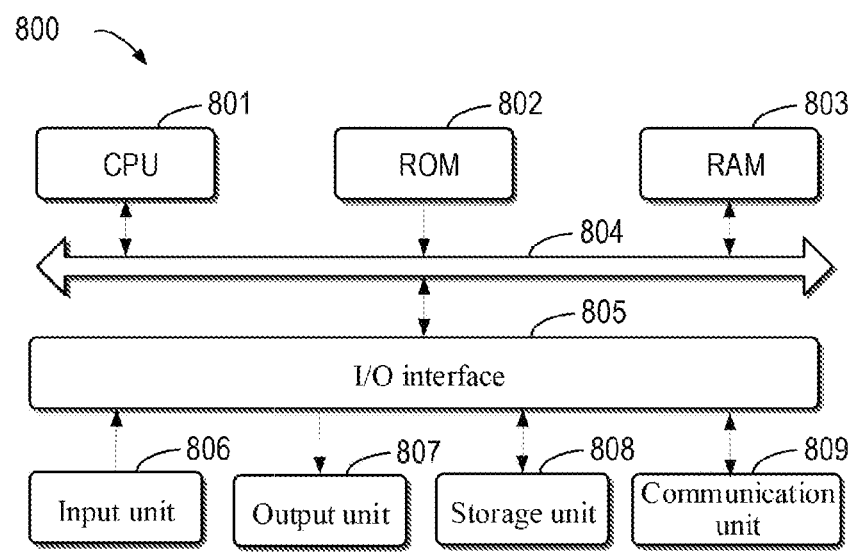
FIG. 8 shows a schematic block diagram of a computing device capable of implementing various embodiments of the present disclosure.

FIG. 8 shows a schematic block diagram of an exemplary device 800 capable of implementing various embodiments of the present disclosure. The device 800 may be used to implement the computing device 170. As shown in the figure, the device 800 includes a central processing unit (CPU) 801 that may perform various appropriate actions and processing in accordance with computer program instructions stored in a read only memory (ROM) 802 or computer program instructions loaded into a random access memory (RAM) 803 from a storage unit 808. In the RAM 803, various programs and data required for the operation of the device 800 may also be stored. The CPU 801, the ROM 802, and the RAM 803 are connected to each other through a bus 804. An input/output (I/O) interface 805 is also coupled to the bus 804.

A plurality of components in the device 800 are coupled to the I/O interface 805, including: an input unit 806, such as a keyboard or a mouse; an output unit 807, such as various types of displays, or speakers; the storage unit 808, such as a disk or an optical disk; and a communication unit 809 such as a network card, a modem, or a wireless communication transceiver. The communication unit 809 allows the device 800 to exchange information/data with other devices over a computer network such as the Internet and/or various telecommunication networks.

The processing unit 801 performs the various methods and processes described above, such as the process 300, process 400, process 500 and/or the process 600. For example, in some embodiments, the process 300, process 400, process 500 and/or the process 600 may be implemented as a computer software program that is tangibly embodied in a machine readable medium, such as the storage unit 808. In some embodiments, some or all of the computer programs may be loaded and/or installed onto the device 800 via the ROM 802 and/or the communication unit 809. When a computer program is loaded into the RAM 803 and executed by the CPU 801, one or more of the actions or steps of the process 800 and/or the process 800 described above may be performed. Alternatively, in other embodiments, the CPU 801 may be configured to perform the process 300, process 400, process 500 and/or the process 600 by any other suitable means (e.g., by means of firmware).

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various actions or steps are described in a specific order, this should not be understood that such actions or steps are required to be performed in the specific order shown or in sequential order, or all illustrated actions or steps should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable subcombination.

Although the embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A method for determining a lane line on a road, comprising the steps of:
   acquiring a first curve, and using the first curve as a reference curve, the first curve being obtained by fitting a first set of points, and the first set of points being selected from points in different areas of the road;
   setting a value of i as 2;
   executing following steps a) to d):
   step a): selecting an $i^{th}$ set of points from the points in the different areas of the road based on the reference curve,
   step b): generating an $i^{th}$ curve by fitting the $i^{th}$ set of points,
   step c): determining a fitting degree difference between an $(i-1)^{th}$ fitting degree associated with the reference curve and an $i^{th}$ fitting degree associated with the $i^{th}$ curve,
   step d) determining whether a convergence condition is met at least partially based on the fitting degree difference;
   in response to failing to meet the convergence condition: setting the generated $i^{th}$ curve as the reference curve, increasing i by 1, and executing steps a) to d); and
   determining the lane line of the road based on the $i^{th}$ set of points when the convergence condition is met.

2. The method according to claim 1, wherein the selecting the $i^{th}$ set of points comprises:
   selecting the $i^{th}$ set of points based on a distance from the points in the different areas of the road to the reference curve, to select points in proximity to the reference curve.

3. The method according to claim 1, wherein the selecting the $i^{th}$ set of points from the points in the different areas of the road further comprises:
   acquiring point cloud data associated with the points in the different areas on the road;
   determining laser reflectivities at locations denoted by the points in the different areas of the road based on the point cloud data; and
   selecting the $i^{th}$ set of points based on the laser reflectivities and the reference curve, to select points in proximity to the reference curve and having high laser reflectivities.

4. The method according to claim 3, wherein the determining whether the convergence condition is met comprises the steps of:
   determining an $(i-1)^{th}$ average laser reflectivity associated with the reference curve based on the laser reflectivities at the locations denoted by the points for fitting the reference curve;
   determining an $i^{th}$ average laser reflectivity associated with the $i^{th}$ curve based on the laser reflectivities at the locations denoted by the points for fitting the $i^{th}$ curve;
   determining a laser reflectivity difference between the $(i-1)^{th}$ average laser reflectivity and the $i^{th}$ average laser reflectivity; and
   determining the convergence condition being met, in response to a weighted sum of the laser reflectivity difference and the fitting degree difference being smaller than a predetermined threshold.

5. The method according to claim 1, wherein the selecting the $i^{th}$ set of points from the plurality of sets of points further comprises the steps of:
   acquiring an image of the lane line in the different areas of the road;

establishing mapping from locations denoted by the points in the different areas of the road to the image; and selecting the $i^{th}$ set of points based on the mapping and the reference curve, to select points in proximity to the reference curve and corresponding to locations in proximity to or on the lane line in the image.

6. The method according to claim 5, wherein the determining whether the convergence condition is met comprises the steps of:

determining confidence levels of the points belonging to the lane line based on the mapping of the locations denoted by the points in the different areas of the road;

determining an $(i-1)^{th}$ average confidence level associated with the reference curve based on the confidence levels of the points for fitting the reference curve;

determining an $i^{th}$ average confidence level associated with the $i^{th}$ curve based on the confidence levels of the points for fitting the $i^{th}$ curve;

determining a confidence level difference between the $(i-1)^{th}$ average confidence level and the $i^{th}$ average confidence level; and determining the convergence condition being met, in response to a weighted sum of the confidence level difference and the fitting degree difference being smaller than a predetermined threshold.

7. The method according to claim 1, wherein the determining whether the convergence condition is met comprises the steps of:

determining the convergence condition being met, in response to i being greater than a predetermined threshold.

8. The method according to claim 1, wherein the $i^{th}$ fitting degree associated with the $i^{th}$ curve is determined based on:

determining distances from the $i^{th}$ set of points to the $i^{th}$ curve;

determining, from the $i^{th}$ set of points, a ratio of points, having distances to the $i^{th}$ curve smaller than a predetermined distance, to the points in the $i^{th}$ set; and determining the $i^{th}$ fitting degree based on a weighted sum of an average distance of the distances and the ratio.

9. An apparatus for determining a lane line on a road, comprising:

at least one processor; and a memory storing instructions, wherein the instructions when executed by the at least one processor, cause the at least one processor to perform operations, the operations comprising the steps of:

acquiring a first curve, and using the first curve as a reference curve, the first curve being obtained by fitting a first set of points, and the first set of points being selected from points in different areas of the road;

setting a value of i as 2;

executing following steps a) to d):

step a): selecting an $i^{th}$ set of points from the points in different areas of the road based on the reference curve, step b): generating an $i^{th}$ curve by fitting the $i^{th}$ set of points, step c): determining a fitting degree difference between an $(i-1)^{th}$ fitting degree associated with the reference curve and an $i^{th}$ fitting degree associated with the $i^{th}$ curve, and step d): determining whether a convergence condition is met at least partially based on the fitting degree difference;

in response to failing to meet the convergence condition: setting the generated $i^{th}$ curve as the reference curve, increasing i by 1, and executing steps a) to d); and determining the lane line of the road based on the $i^{th}$ set of points when the convergence condition is met.

10. The apparatus according to claim 9, wherein the selecting the $i^{th}$ set of points comprises:

selecting the $i^{th}$ set of points based on a distance from the points in the different areas of the road to the reference curve, to select points in proximity to the reference curve.

11. The apparatus according to claim 9, wherein the selecting the $i^{th}$ set of points from the points in the different areas of the road further comprises the steps of:

acquiring point cloud data associated with the points in the different areas of the road;

determining laser reflectivities at locations denoted by the points in the different areas of the road based on the point cloud data; and selecting the $i^{th}$ set of points based on the laser reflectivities and the reference curve, to select points in proximity to the reference curve and having high laser reflectivities.

12. The apparatus according to claim 11, wherein the determining whether the convergence condition is met comprises the steps of:

determining an $(i-1)^{th}$ average laser reflectivity associated with the reference curve based on the laser reflectivities at the locations denoted by the points for fitting the reference curve;

determining an $i^{th}$ average laser reflectivity associated with the $i^{th}$ curve based on the laser reflectivities at the locations denoted by the points for fitting the $i^{th}$ curve;

determining a laser reflectivity difference between the $(i-1)^{th}$ average laser reflectivity and the $i^{th}$ average laser reflectivity; and determining the convergence condition being met, in response to a weighted sum of the laser reflectivity difference and the fitting degree difference being smaller than a predetermined threshold.

13. The apparatus according to claim 9, wherein the selecting the $i^{th}$ set of points from the plurality of sets of points further comprises the steps of:

acquiring an image of the lane line in the different areas of the road;

establishing mapping from locations denoted by the points in the different areas of the road to the image; and selecting the $i^{th}$ set of points based on the mapping and the reference curve, to select points in proximity to the reference curve and corresponding to locations in proximity to or on the lane line in the image.

14. The apparatus according to claim 13, wherein the determining whether the convergence condition is met comprises the steps of:

determining confidence levels of the points belonging to the lane line based on the mapping of the locations denoted by the points in the different areas of the road;

determining an $(i-1)^{th}$ average confidence level associated with the reference curve based on the confidence levels of the points for fitting the reference curve;

determining an $i^{th}$ average confidence level associated with the $i^{th}$ curve based on the confidence levels of the points for fitting the $i^{th}$ curve;

determining a confidence level difference between the $(i-1)^{th}$ average confidence level and the $i^{th}$ average confidence level; and determining the convergence condition being met, in response to a weighted sum of the confidence level difference and the fitting degree difference being smaller than a predetermined threshold.

15. The apparatus according to claim 9, wherein the determining whether the convergence condition is met comprises:
determining the convergence condition being met, in response to i being greater than a predetermined threshold.

16. The apparatus according to claim 9, wherein the $i^{th}$ fitting degree associated with the $i^{th}$ curve is determined based on:
determining distances from the $i^{th}$ set of points to the $i^{th}$ curve;
determining, from the $i^{th}$ set of points, a ratio of points, having distances to the $i^{th}$ curve smaller than a predetermined distance, to the points in the $i^{th}$ set; and
determining the $i^{th}$ fitting degree based on a weighted sum of an average distance of the distances and the ratio.

17. A non-transitory computer storage medium, storing a computer program therein, the program, when executed by a processor, causes the processor to perform operations, the operations comprising:
acquiring a first curve, and using the first curve as a reference curve, the first curve being obtained by fitting a first set of points, and the first set of points being selected from points in different areas of the road;
setting a value of i as 2;
executing following steps a) to d):
step a): selecting an $i^{th}$ set of points from the points in the different areas of the road based on the reference curve;
step b): generating an $i^{th}$ curve by fitting the $i^{th}$ set of points,
step c): determining a fitting degree difference between a $(i-1)^{th}$ fitting degree associated with the reference curve and an $i^{th}$ fitting degree associated with the $i^{th}$ curve,
step d): determining whether a convergence condition is met at least partially based on the fitting degree difference, and
in response to failing to meet the convergence condition: setting the generated $i^{th}$ curve as the reference curve, increasing i by 1, and executing steps a) to d); and
determining the lane line of the road based on the $i^{th}$ set of points when the convergence condition is met.

* * * * *